US012611646B2

(12) United States Patent
Al-Haj Ali

(10) Patent No.: US 12,611,646 B2
(45) Date of Patent: Apr. 28, 2026

(54) POLYMERIZATION PROCESS AND REACTOR FOR CONTROLLING MOLECULAR WEIGHT DISTRIBUTION AND COMONOMER COMPOSITION DISTRIBUTION

(71) Applicant: Borealis AG, Vienna (AT)

(72) Inventor: Mohammad Al-Haj Ali, Porvoo (FI)

(73) Assignee: BOREALIS GMBH, Vienna (AT)

( * ) Notice: Subject to any disclaimer, the term of this patent is extended or adjusted under 35 U.S.C. 154(b) by 818 days.

(21) Appl. No.: 17/776,795

(22) PCT Filed: Dec. 17, 2020

(86) PCT No.: PCT/EP2020/086768
§ 371 (c)(1),
(2) Date: May 13, 2022

(87) PCT Pub. No.: WO2021/122992
PCT Pub. Date: Jun. 24, 2021

(65) Prior Publication Data
US 2022/0395801 A1     Dec. 15, 2022

(30) Foreign Application Priority Data
Dec. 20, 2019     (EP) ..................................... 19218502

(51) Int. Cl.
*B01J 19/18*          (2006.01)
*B01J 4/00*          (2006.01)
(Continued)

(52) U.S. Cl.
CPC ........... *B01J 19/1837* (2013.01); *B01J 4/001* (2013.01); *B01J 19/0013* (2013.01);
(Continued)

(58) Field of Classification Search
None
See application file for complete search history.

(56) References Cited

FOREIGN PATENT DOCUMENTS

| | | |
|---|---|---|
| WO | 2009/142730 A1 | 11/2009 |
| WO | WO-2019040561 A1 * | 2/2019 ............ B01J 8/0015 |

OTHER PUBLICATIONS

Ali E M et al: "Broadening the polyethylene molecular weight distribution by controlling the hydrogen concentration and catalyst feed rates", ISA Transactions, Instrument Society of America. Pittsburgh, US, vol. 49, No. 1, published Jan. 1, 2010, pp. 177-187, XP026819844, ISSN: 0019-0578.

* cited by examiner

*Primary Examiner* — Richard A. Huhn
(74) *Attorney, Agent, or Firm* — Lippes Mathias LLP

(57)     ABSTRACT

A reactor for the polymerization of olefins comprising a first inlet for introducing a first stream comprising monomer(s), catalyst(s) and optionally hydrogen, solvent or comonomer(s) and/or mixtures thereof, at least one outlet for withdrawing a product stream, characterized in that the reactor further comprises at least one second inlet for introducing a second stream comprising monomer(s), catalyst(s) and optionally hydrogen, solvent or comonomer(s) and/or mixtures thereof; and a process for polymerizing olefins in a reactor according to the present invention, comprising the steps of introducing monomer(s), catalyst(s), and optionally hydrogen, solvent or comonomer(s) and/or mixtures thereof as the first stream via the first inlet into the reactor forming a reaction mixture; polymerizing a polymer from the reaction mixture; withdrawing the product stream via the at least one outlet from the reactor; characterized in that the process comprises a further step of introducing a second stream comprising monomer(s), catalyst(s), and
(Continued)

Reactor according to the present invention optionally hydrogen, solvent or comonomer(s) and/or mixtures thereof into the reactor via the at least one second inlet into the reactor.

10 Claims, 2 Drawing Sheets

(51) Int. Cl.
B01J 19/00 (2006.01)
C08F 210/02 (2006.01)
(52) U.S. Cl.
CPC ......... B01J 19/0066 (2013.01); C08F 210/02 (2013.01); *B01J 2219/00123* (2013.01); *B01J 2219/00159* (2013.01); *B01J 2219/00186* (2013.01)

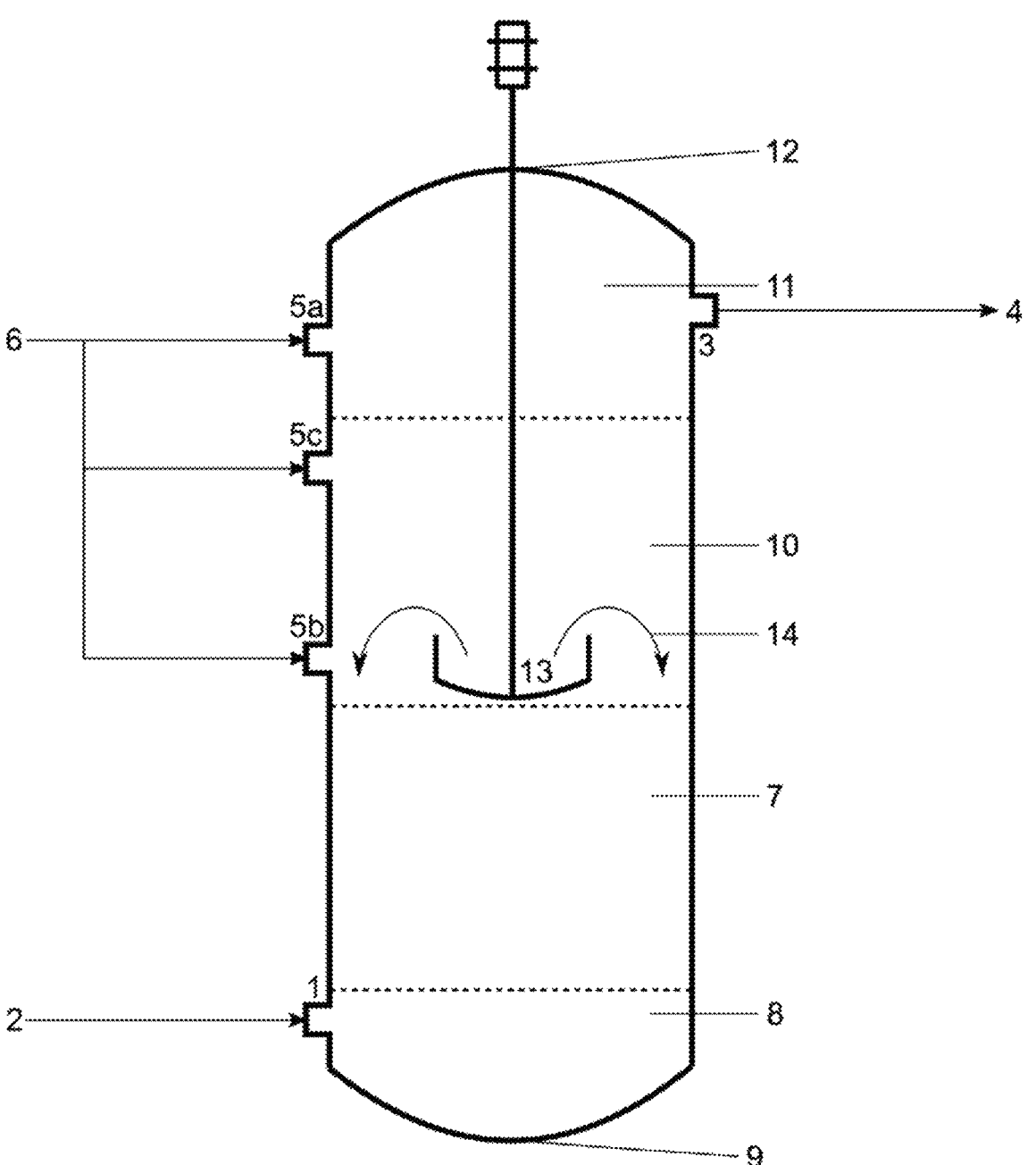
Figure 1: Reactor according to the present invention

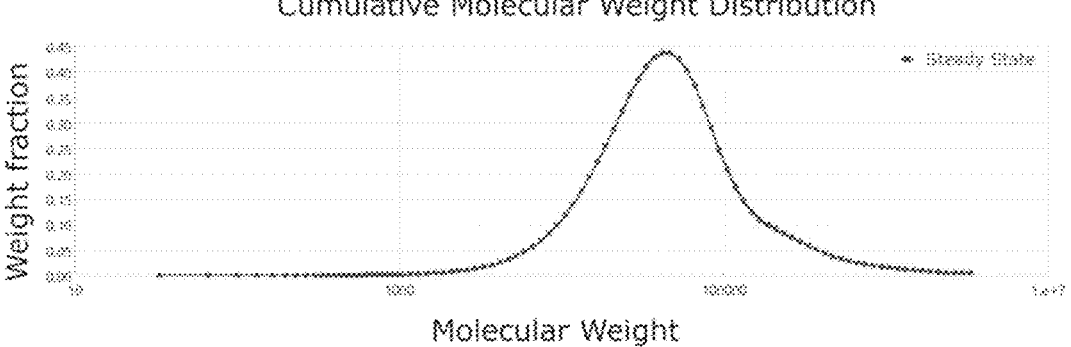

Figure 2: Molecular weight distribution of the polyethylene produced in the reactor run of Comparative Example 1 under steady state conditions.

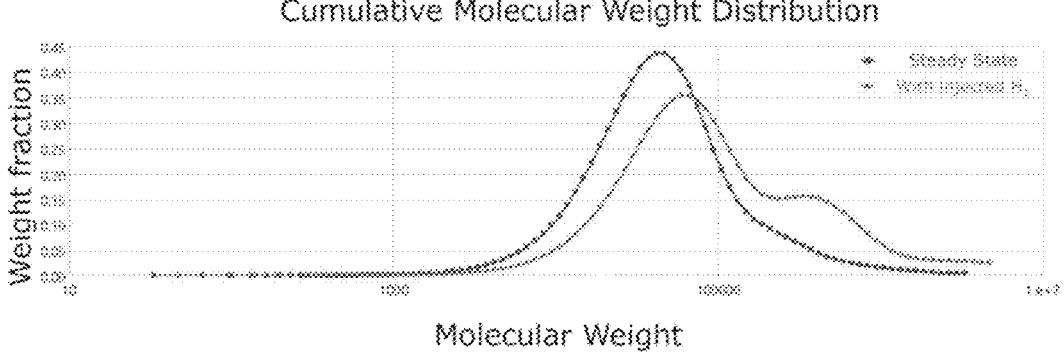

Figure 3: Molecular weight distribution of the polyethylene produced in the reactor run according to Inventive Example 1 and resulting from the injection of hydrogen via the second inlet in comparison to the molecular weight distribution of the polyethylene produced by running the reactor under steady state conditions (Comparative Example 1).

POLYMERIZATION PROCESS AND REACTOR FOR CONTROLLING MOLECULAR WEIGHT DISTRIBUTION AND COMONOMER COMPOSITION DISTRIBUTION

CROSS-REFERENCE TO RELATED APPLICATIONS

This application is a 371 of PCT application No. PCT/ EP2020/086768, filed on Dec. 17, 2020, which claims priority to European Patent Application No. 19218502.3 filed on Dec. 20, 2019, and entitled "POLYMERIZATION PROCESS AND REACTOR FOR CONTROLLING MOLECULAR WEIGHT DISTRIBUTION AND COMONOMER COMPOSITION DISTRIBUTION," the disclosure of which is herein incorporated by reference in its entirety.

BACKGROUND

The present invention relates to a process and a reactor for the polymerization of olefins, preferably solution polymerization of olefins, more preferably solution copolymerization of olefins, wherein the breadth of the molecular weight distribution and/or the comonomer composition distribution can be controlled within the reactor without affecting the reactor assembly design and/or the catalyst composition used.

Polymers produced from metallocene catalysts and other single site catalysts generally have a narrow molecular weight distribution (MWD). For example, the Mw/Mn values for polymers made with metallocene catalyst systems in homogeneous polymerization media are typically close to the statistically expected value of 2.0. Other catalysts of commercial significance (such as Ziegler-Natta catalysts), however, make polymers with much broader MWD. Single site catalysts also produce narrow comonomer composition distribution (CCD).

Narrow MWD and narrow CCD generally conveyed by metallocene catalysts may be advantageous in some applications. However, there are certain applications where narrower MWD and CCD produced by metallocene catalysts are deleterious, for example in melt processing and solid state processing (orientation) of polymers. Furthermore, in film processing and fiber processing applications, a broader molecular weight distribution provides particular advantages in both melt processability and orientation processability.

Methods provided in the prior art for broadening the molecular weight distribution include in-situ approaches, such as utilizing series or parallel reactors. Another method included the use of mixed catalysts. Melt-blending in an extruder of polymer components with differing distributions of molecular weight to provide for broadened molecular weight distribution is also widely practiced.

PROBLEM TO BE SOLVED

However, these methods for controlling the molecular weight distribution add both process complexity and costs.

Polymerization reactors used in solution polymerization can produce polyethylene with a relatively broad molecular weight distribution (polydispersity index (PDI) ~3.5). Nevertheless, this distribution is not broad enough to achieve the desired characteristics in melt processability and orientation processability. Moreover, this broadening depends on the mixing behavior inside the reactor that is a function of the mixture viscosity inside the reactor.

Therefore, there still is a need for an in-reactor control of the breadth of the molecular weight distribution and/or the comonomer composition distribution of a polymer without modifying the catalyst mixture and/or the reactor assembly setup.

OBJECT OF THE INVENTION

It is therefore an object of the present invention to find a process and a reactor for the polymerization of olefins, preferably solution polymerization of olefins, more preferably solution copolymerization of olefins, wherein the breadth of the molecular weight distribution and/or the comonomer composition distribution can be controlled within the reactor without affecting the reactor assembly design and/or the catalyst composition used.

SUMMARY OF THE INVENTION

It has been further surprisingly found out that the above-mentioned object can be achieved by a process for polymerizing olefins comprising the steps of introducing monomer(s), catalyst(s), and optionally hydrogen, solvent or comonomer(s) and/or mixtures thereof as the first stream into a reactor forming a reaction mixture, polymerizing a polymer from the reaction mixture, withdrawing the product stream comprising the polymer from the reactor, characterized in that the process comprises a further step of introducing a second stream comprising monomer(s), catalyst(s), and optionally hydrogen, solvent or comonomer(s) and/or mixtures thereof into the reactor.

It has now surprisingly been found out that above-mentioned object can be achieved by a reactor for the polymerization of olefins comprising a first inlet for introducing a first stream comprising monomer(s), catalyst(s) and optionally hydrogen, solvent or comonomer(s) or mixtures thereof, at least one outlet for withdrawing a product stream, characterized in that the reactor further comprises at least one second inlet for introducing a second stream comprising monomer(s), catalyst(s) and optionally hydrogen, solvent or comonomer(s) or mixtures thereof.

The present invention is further directed to the use of the process and/or the reactor of the present invention to control the molecular weight distribution and/or the comonomer composition distribution in the produced polymer.

The particular benefit of such a configuration is that the properties of the produced polymer can be modified or controlled by changing the gradient in concentrations of components and/or the gradient of temperature inside the reactor. Decreasing the gradient results in narrower MWD and CCD, whereas increasing the gradient results in broader MWD and CCD.

DETAILED DESCRIPTION

Definitions

The term 'solution polymerization' as used herein denotes a method of polymerization of an olefin monomer, wherein the monomer is dissolved in a non-reactive solvent that contains a catalyst. The polymerization reaction results in a polymer, which is also soluble in the chosen solvent. Moreover, the heat released by the reaction is also absorbed by the solvent.

The term 'stirrer' as used therein denotes a device for rotating the reaction mixture in the reactor during polymerization. The upper end of the stirrer is the boundary of the stirrer opposite to the direction of the gravitational force, whereby only the part is considered which achieves the rotating of the reaction mixture. Any further means for rotating the stirrer (axis etc.) are not considered when defining the upper end of the stirrer. The same holds likewise for the lower end with the difference that the lower end of the stirrer is the boundary of the stirrer in direction of the gravitational force.

Process of the Invention

Preferably, the process of the present invention is a process for the production of an α-olefin copolymer. More preferably, the process is a solution polymerization process, even more preferably, a high temperature solution polymerization process.

In solution polymerization processes, the monomer is polymerized at a temperature in which the polymer is dissolved in the solvent mixture, which is present in the process.

Preferably, the process utilizes one or more polymerization reactors. Suitable reactors include unstirred or stirred, spherical, cylindrical and tank-like vessels and recirculating loop reactors and tubular reactors. Such reactors typically include feeding points for monomer, optional comonomer, solvent, catalyst and optional other reactants and additives and withdrawal points for polymer solutions. In addition, the reactors may include heating or cooling means.

Typically, the solution polymerization process is a high temperature solution polymerization process, using a polymerization temperature of greater than 100° C. Preferably, the polymerization temperature is at least 110° C., more preferably at least 150° C. The temperature in the reactors is such that the polymer formed in the polymerization reaction is completely dissolved in the reaction mixture comprising the solvent, the comonomer(s), the chain transfer agent and the polymer. The temperature is suitably greater than the melting temperature of the polymer. Thus, when the polymer is a homo- or copolymer of ethylene the temperature is suitably from 130 to 250° C., such as from 150 to 200° C., depending on the content of comonomer units in the polymer. When the polymer is a homo- or copolymer of propylene the temperature is suitably from 165 to 250° C., such as from 170 to 220° C., depending on the content of comonomer units in the polymer. The polymerization temperature can be up to 250° C. The pressure in the solution polymerization process is preferably in a range of from 30 to 200 bar, preferably from 50 to 160 bar and more preferably from 60 to 150 bar.

The monomer used in the present process is an α-olefin, preferably an olefin selected from ethylene, propylene and 1-butene, most preferably ethylene.

Preferably, also a comonomer is used in the polymerization process. When the monomer is an olefin monomer as disclosed above, then the comonomer is different from the olefin monomer and is selected from the group consisting of linear and cyclic olefins and diolefins having from 2 to 12 carbon atoms and the mixtures thereof. More preferably, the comonomer is an alpha-olefin different from the olefin monomer and is selected from the group consisting of linear olefins having from 2 to 12 carbon atoms and mixtures thereof, preferably 4 to 10 carbon atoms, most preferably 1-octene.

The polymerization is typically conducted in the presence of an olefin polymerization catalyst. Preferably, the catalyst comprises a specifically substituted, bridged hafnocene catalyst complex, comprising a cyclopentadienyl (Cp) ligand, a fluorenyl (Flu) ligand and a specifically covalent bridge connecting the two ligands, along with a boron based cocatalyst or an alum inoxane cocatalyst. Most preferably, the polymerization is conducted in the presence of an olefin polymerization catalyst as described in WO 2018/178151, WO 2018/178152, WO 2018/108917, or WO 2018/108918.

In the solution polymerization process a solvent is also present. The solvent is in liquid or supercritical state under the polymerization conditions. The solvent is typically and preferably a hydrocarbon solvent. The liquid hydrocarbon solvent used is preferably a $C_{5-12}$ hydrocarbon, which may be unsubstituted or substituted by $C_{1-4}$ alkyl group such as pentane, methyl pentane, hexane, heptane, octane, cyclohexane, methylcyclohexane and hydrogenated naphtha. More preferably, unsubstituted $C_{6-10}$ hydrocarbon solvents are used.

In addition, other components may be added in the process of the present invention. It is known to feed hydrogen into the reactor for controlling the molecular weight of the polymer formed during the polymerization. The use of different antifouling compounds is also already known in the art for non-solution polymerization processes. In addition, different kinds of activity boosters or activity retarders may be used for controlling the activity of the catalyst.

Reactor of the Invention

The reactor used in the invention practically can be any reactor for polymerization in which a gradient of reaction conditions can occur. Therefore, generally, the reactor comprises at least one inlet for introducing a first stream of reaction mixture and at least one outlet for withdrawing a product stream comprising polymer. The inlet and outlet are positioned in the walls of the reactor in a fashion to create a flow direction of the solvent and/or gas stream of the reaction mixture. This is preferably achieved in that the inlet and outlet are positioned opposite to each other. Even more preferably, the inlet is positioned in the lower part of the reactor and the outlet is positioned in the upper part of the reactor. In this fashion the buoyancy force is used to determine the flow direction of the solvent and/or gases.

The shape of the reactor is preferably essentially cylindrical. Generally, the reactor can be divided in an upper half and a lower half, whereas the lower half comprises a lower part, which preferably has a conical shape or the shape of a dome, and which further comprises a bottom end at the apex of the conical shape or shape of a dome. Likewise, the upper half comprises an upper part, which preferably has a conical shape or the shape of a dome, and which further comprises a top end at the apex of the conical shape or shape of a dome.

By such a setup the reactor according to the invention provides an environment, in which the reaction conditions can vary over the flow path of the solvent and/or gases. Thereby, the reaction conditions can be e.g. the temperature, but in particular also concentrations of monomers, comonomers, hydrogen and/or catalyst.

In a preferred embodiment of the invention, the reactor comprises at least one stirrer, preferably at least one impeller. The presence of such a stirrer can induce a hydrodynamic pattern in the reaction mixture. While such a pattern is not essential for the present invention, the effect of the invention will be more significant.

Furthermore, the reactor according to the present invention has at least one second inlet for introducing a second stream of reaction mixture. The second inlet can be located generally anywhere at the reactor walls, as long as the introduced second stream is able to influence the gradient of reaction conditions in the reactor. However, in case of a reactor for solution polymerization comprising a stirrer, preferably an impeller, it is preferable that the at least one second inlet is located in the upper half of the reactor, whereas, besides others, positions in the upper part, in the preferably essentially cylindrically shaped part of the upper half or below an upper end of the stirrer are conceivable.

SHORT DESCRIPTION OF THE FIGURES

FIG. 1 shows a preferred embodiment of a reactor according to the present invention.

FIG. 2 shows the molecular weight distribution (MWD) of the ethylene polymer produced in Comparative Example 1 (CE1).

FIG. 3 shows the molecular weight distribution (MWD) of the ethylene polymer produced in Inventive Example 1 (IE1).

DETAILED DESCRIPTION OF THE FIGURES

A preferred embodiment of a reactor according to the present invention is shown in FIG. 1. This reactor preferably is used for a continuous solution polymerization process. It has a cylindrical shape and includes a first inlet (1) for a first stream (2) introducing the components for solution polymerization into the reactor. The first stream comprises at least monomer, catalyst and solvent. Optionally, the first stream can comprise comonomer and/or hydrogen. Furthermore, the reactor comprises at least one outlet (3) for the removal of a product stream (4). Generally, the reactor can be divided in an upper half (10) and a lower half (7), whereas the lower half comprises a lower part (8), which further comprises the bottom end (9). Likewise, the upper half (10) comprises an upper part (11), which further comprises the top end (12).

The reactor according to the preferred embodiment of the present invention further comprises a stirrer (13).

Furthermore, the reactor according to the preferred embodiment depicted in FIG. 1 has at least one second inlet (5a-c). The second inlet can be located generally anywhere at the reactor, as long as the introduced second stream (6) is able to influence the gradient of reaction conditions in the reactor. However, preferably, in case of a reactor for solution polymerization comprising a stirrer it is preferable to locate the at least one second inlet (5a-c) in the upper half of the reactor, whereas, besides others, positions in the conical shaped or dome shaped upper part (5a), in the cylindrically shaped part of the upper half (5c) or below an upper end of the stirrer (5b) are conceivable.

REFERENCE SIGNS

1 first inlet
2 first stream
3 outlet
4 product stream
5 at least one second inlet
6 second stream
7 lower half of reactor
8 lower part of reactor
9 bottom end of reactor
10 upper half of reactor

11 upper part of reactor
12 top end of reactor
13 stirrer
14 hydrodynamic pattern in the reactor

DETAILED DESCRIPTION OF THE INVENTION

The present invention is concerned with a reactor for polymerization, preferably solution polymerization, of olefins, e.g. monomer(s) and optionally comonomer(s), comprising a first inlet for introducing a first stream comprising monomer(s), catalyst(s) and optionally hydrogen, solvent, or comonomer(s) and/or mixtures thereof, at least one outlet for withdrawing a product stream, characterized in that the reactor further comprises at least one second inlet for introducing a second stream comprising monomer(s), catalysts(s), and optionally hydrogen, solvent and/or comonomer(s) and/or mixtures thereof.

Generally, in a reactor either being driven continuously having an inlet and at least one outlet at opposite ends or comprising a stirrer, which provides a certain hydrodynamic pattern, exhibits a gradient in e.g. temperature of the reaction mixture, concentration of monomer(s), optionally comonomer(s), as well as catalyst. Such a gradient represents different reaction parameters at different locations in the reactor. Certainly, different reaction parameters will invoke e.g. the predominant formation of shorter or longer chain lengths of the produced polymer or e.g. preferred or less preferred comonomer incorporation into the polymer chain. Hence, a gradient in reaction conditions, and therefore varying reaction conditions, leads to a broadening of the molecular weight distribution (MWD) of the produced polymer as well as a broadening of the comonomer composition distribution (CCD).

Typically, in a reactor for polymerization of olefins, the monomer and comonomer concentration gradient is decreasing along the flow paths of the reaction mixture. This is due to the fact that both monomers and comonomers are consumed during the polymerization reaction. Likewise, the temperature gradient along the flow path of the reaction mixtures in reactors for olefin polymerization usually is increasing, as the polymerization reaction usually is exothermic.

The reactor according to the present invention can be any olefin polymerization reactor having a gradient in temperature and amount of monomer(s) and comonomer(s). In such an embodiment, the effect of the present invention is that the gradient (and therefore MWD and/or CCD) can be at least punctually influenced. Hence, in case of a reactor having a substantially laminar flow from the inlet(s) to the outlet(s), the reaction conditions can be influenced downwards from the at least one second inlet on.

Preferably, the reactor according to the present invention is a polymerization reactor, which exhibits a cyclic hydrodynamic pattern (cf. FIG. 1, 14). The effect of this preferred embodiment of the invention is that the influence on the reaction conditions induced by the at least second inlet affects the whole reaction mixture due to the back cycling caused by the cyclic hydrodynamic pattern.

In an even more preferred embodiment of the invention, the reactor is a reactor for a solution polymerization process of olefin monomer(s) and optionally comonomer(s) (solution polymerization reactor, SPR). The SPR preferably comprises a stirrer. Furthermore, the SPR preferably has a substantially cylindrical shape, the axis of which preferably is oriented along the direction of the gravitational force.

Preferably, the upper part and/or the lower part of the substantially cylindrical shape of the SPR have a conical shape or the shape of a dome. This shape supports the formation of a hydrodynamic pattern in the reaction mixture induced rotation of the stirrer. In this hydrodynamic pattern the reaction mixture moves in the middle of the reactor from the lower part to the upper part of the reactor and in the outer parts, e.g. close to the walls of the reactor, the reaction mixture moves from the upper part to the lower part of the reactor. The effect of this more preferred embodiment in particular in comparison to the embodiment with a cyclic hydrodynamic pattern only is that a solvent is involved, which leads to even better distribution of the influence on the reaction conditions by the second stream induced by the at least one second inlet.

Due to the hydrodynamic pattern as described above and as found, for example, in a SPR, in the upper half of the reactor, both the temperature gradient as well as the gradient of the amount of monomer(s) and optionally comonomer(s) reaches the extreme of high temperatures and low amounts of monomer(s) and optionally comonomer(s). The elevated temperatures are caused by the forthcoming exothermic polymerization reaction. Likewise, the reduced amount of monomer(s) and comonomer(s) is caused by the forthcoming polymerization reaction, which consumes the monomer(s) and comonomer(s) yielding polymer. When the reaction mixture is circulated back to the lower part of the reactor following the hydrodynamic pattern, it is enriched again in monomer(s) and optionally comonomer(s) and is cooled down due to the lower temperature of the first stream (2).

Such gradients in temperature and amounts monomer(s) and optionally comonomer(s) can also be found in other types of reactors. Therefore, the present invention is suitable for any kind of olefin polymerization reactor, which exhibits such a gradient.

It now has been found out that by providing a second inlet in the reactor and by providing a step of introducing a second stream comprising monomer(s), optionally comonomer(s), solvent, catalyst, and/or hydrogen or mixtures thereof via this second inlet, the gradient in the reactor can be influenced. It furthermore has been found out that increasing such gradients results in even broader MWD and CCD, while reducing such gradients results in narrower MWD and CCD down to the MWD/CCD limit of the catalyst.

Therefore, the effect of the present invention can be achieved most efficiently if the at least second inlet is located at a location in the reactor, where the reaction conditions are at one extreme of the gradient, preferably in the upper half of the reactor in case of a SPR, whereas the first inlet is located at a location in the reactor, where the reaction conditions are on the other extreme of the gradient, preferably in the lower half of the reactor in case of a SPR. However, it should be understood that the effect of the present invention is still present, possibly for a lower extent, if the at least second inlet is not necessarily located exactly at the location in the reactor, where the reaction conditions are at one extreme of the gradient.

Hence, in case of the preferred embodiment of the invention related to a SPR, the at least one second inlet is preferably placed in the upper half of the reactor, as the location, where the reaction conditions are at one extreme of the gradient, can be found there.

If the at least one second stream is located in the upper half of the reactor, in one preferred embodiment of the invention, the reaction mixture is already enriched in monomer(s) and optionally comonomer(s) in the upper part of the reactor. Furthermore, in this preferred embodiment, the reaction mixture can also be already cooled by the second stream before being recirculated to the lower part of the reactor. Hence, in such an embodiment of the invention, the temperature gradient and/or gradient of the amount of monomer(s) and optionally amount of comonomer(s) is reduced. In a first most preferred embodiment, no gradient in temperature and/or gradient in amount of monomer(s) and optionally amount of comonomer(s) is observable in the reactor. Such an embodiment affects the MWD and the CCD in that the most narrow MWD and CCD is achieved.

Furthermore, in a second preferred embodiment of the invention, the gradient found in the reactor is increased affected by the nature of the second stream (6) introduced via the at least one second inlet (5a-c). Thereby, the reaction conditions can be affect in that e.g. the temperature is either further increased or cooled down to an extent that the gradient is not reduced or eliminated according to the first preferred embodiment, but rather cooled down even further than the temperature found in the bottom part of the reactor. Likewise, the difference in concentrations and their ratios of monomer(s), catalyst(s), and optionally hydrogen, solvent or comonomer(s) and/or mixtures thereof is further increased. This can be done either by introducing e.g. comonomer to further dilute the reaction mixture in the upper half of the reactor forming an even increased gradient of concentration of monomer(s), catalyst(s) and optionally comonomer(s). However, in parallel to the change in temperature, the concentration of monomer(s), catalyst(s) and optionally comonomer(s) can be further increased up to an extent that the gradient is not reduced or eliminated according to the first preferred embodiment, but rather the concentrations are increased even further than the concentrations found in the bottom part of the reactor. Hence, in such a second preferred embodiment of the invention, the temperature gradient and/ or gradient of the amount of monomer(s) and optionally amount of comonomer(s) is further increased. Such an embodiment affects the MWD and the CCD in that a broadening of the MWD and CCD is achieved.

The reactor according to the present invention preferably comprises a lower half (7) comprising a lower part (8) comprising a bottom end (9) and an upper half (10) comprising an upper part (11) comprising a top end (12).

In the reactor according to the present invention, preferably the first inlet (2) is located in the lower part (8) of the reactor. The first inlet (2) can be located at the bottom end (9) of the reactor.

In the reactor according to the present invention, the at least one outlet (3) is preferably located in the upper part (11) of the reactor. The at least one outlet (3) can be located at the top end (12) of the reactor.

Preferably, the reactor is a reactor for solution polymerization of olefins.

In a preferred embodiment of the invention, the reactor further comprises a stirrer (13), In a preferred embodiment of the invention, the reactor has a substantially cylindrical shape.

Furthermore, the upper part (11) of the reactor preferably is conically shaped or has a dome shape. Likewise, the lower part (8) of the reactor preferably is conically shaped or has a dome shape.

Preferably, the at least one second inlet (5a-c) is located in the upper half (10) of the reactor. In a first even more preferable embodiment, the at least one second inlet (5a) is located in the conically shaped upper part (11) of the reactor. In a second even more preferable embodiment, the at least one second inlet (5b, 5c) is located in a cylindrically shaped part of the upper half (10) of the reactor. In this second more preferable embodiment, the at least one second inlet (5b) is most preferably located below an upper end and above a lower end of the stirrer (13) or the at least one second inlet (5c) is most preferably located above an upper end of the stirrer (13).

Preferably, the process according to the present invention is a continuous process. Also preferably, the process of the present invention is a copolymerization process for producing comonomers. More preferably, the polymerization is conducted in solution. In this case the reactor according to the present invention is suitable for solution polymerization. More preferably, in this case the reactor comprises a stirrer (13), more preferably an impeller. Preferably, the process further comprises the step of stirring the reaction mixture in the reactor.

Preferably, in the process of the present invention, the temperature, the concentrations of monomer(s), catalyst(s), and optionally comonomer(s) in the second stream is configured to adjust the temperature and/or concentration of monomer(s), catalyst(s), or optionally comonomer(s) in the reactor.

In a first more preferable embodiment of the invention, the temperature, the concentration of monomer(s), catalyst(s), and/or optionally comonomer(s) in the second stream is configured to reduce, preferably remove, a gradient in temperature and/or concentration of monomer(s), catalyst(s), and/or optionally comonomer(s) over the reactor.

Preferably, in the process of the first more preferred embodiment of present invention, the temperature of the second stream is lower than the temperature of the reaction mixture at a level of the second inlet.

Likewise, in the first more preferable embodiment of the invention, the concentration of monomer(s), catalyst(s), and/or optionally comonomer(s) of the second stream is higher than the concentration of monomer(s), catalyst(s), and/or optionally comonomer(s) of the reaction mixture at a level of the second inlet.

Furthermore, in a second more preferably embodiment of the invention, the temperature, the concentration of monomer(s), catalyst(s), and/or optionally comonomer(s) in the second stream is configured to induce, preferably increase, a gradient in temperature and/or concentration of monomer(s), catalyst(s), and/or optionally comonomer(s) over the reactor.

Preferably, in the process of the second more preferred embodiment of present invention, the temperature of the second stream is higher than the temperature of the reaction mixture at a level of the second inlet.

Likewise, in the second more preferable embodiment of the invention, the concentration of monomer(s), catalyst(s), and/or optionally comonomer(s) of the second stream is lower than the concentration of monomer(s), catalyst(s), and/or optionally comonomer(s) of the reaction mixture at a level of the second inlet.

In a more preferable embodiment of the invention, the process and the reactor of the invention are used to narrow the molecular weight distribution and/or the comonomer composition distribution in the produced polymer.

In a more preferable embodiment of the invention, the process and the reactor of the invention are used to broaden the molecular weight distribution and/or the comonomer composition distribution in the produced polymer.

EXAMPLES

Comparative Example 1 (CE1)

In this example, an ethylene/1-octene solution copolymerization is conducted in a reactor according to the present invention without introduction of a second stream. The feed rates of the most relevant components to the reactor are shown in table 1 below. The reactor is operated at a temperature of 160° C. and a pressure of 85 bar.

TABLE 1

| Feeding rates of the polymerization components to the reactor according to Comparative Example 1 | |
| --- | --- |
| Components | Feed rate [kg/h] |
| $H_2$ | 0.00057 |
| ethylene | 4.9 |
| 1-octene | 7.3 |
| iso-octene | 3.6 |
| n-hexane | 13.5 |
| catalyst | 0.000007 |

The molecular weight distribution of the produced polyethylene is depicted in FIG. 2. These results show that such distribution is narrow with a polydispersity index around 2.2.

Inventive Example 1 (IE1)

In this example, the reaction of Comparative Example 1 is repeated, but additionally hydrogen is injected into the top part via the second inlet of the reactor with a feed rate of 0.00005 kg/h. In this setup the concentration of monomer and comonomer is reduced in the upper part increasing the gradient in $H_2/C_2$ ratio inside the reactor that affects the molecular weight distribution of the produced polymer resulting in a wider distribution as shown in FIG. 3. The results prove the effect of such operation in modifying the polymer microstructure.

The invention claimed is:

1. A reactor for the polymerization of olefins comprising:
   a first inlet (1) configured to introduce into the reactor a first stream (2) comprising monomer(s), catalyst(s) and optionally hydrogen, solvent or comonomer(s) and/or mixtures thereof,
   at least one outlet (3) configured to withdraw from the reactor a product stream (4),
   characterized in that the reactor further comprises
   at least one second inlet (5a-c) configured to introduce into the reactor a second stream (6) comprising monomer(s), catalyst(s) and optionally hydrogen, solvent or comonomer(s) and/or mixtures thereof,
   wherein the first inlet (1) is positioned in a lower part of the reactor and the outlet (3) is positioned in an upper part of the reactor; and
   wherein the reactor is configured so that a reaction mixture moves in a middle of the reactor from the lower part to the upper part of the reactor, and in an outer part of the reactor the reaction mixture moves from the upper part to the lower part of the reactor.

2. The reactor according to claim 1, wherein the reactor further comprises a stirrer (13).

3. The reactor according to claim 1, wherein the at least one second inlet (5a-c) is located in the upper half (10) of the reactor.

4. The reactor according to claim 1, wherein the temperature and/or the concentrations of the monomer(s), catalyst(s), and optional comonomer(s) in the second stream is configured to adjust the temperature and/or concentration of monomer(s), catalyst(s), or optional comonomer(s) in the reactor.

5. The reactor according to claim 1, further comprising a source for the first stream (2) connected to the first inlet (1).

6. A process for polymerizing olefins in a reactor according to claim 1, comprising the steps of introducing monomer(s), catalyst(s), and optionally hydrogen, solvent or comonomer(s) and/or mixtures thereof as the first stream (2) via the first inlet (1) into the reactor forming a reaction mixture;

polymerizing a polymer from the reaction mixture;

withdrawing the product stream (4) via the at least one outlet (3) from the reactor;

characterized in that the process comprises a further step of introducing a second stream (6) comprising monomer(s), catalyst(s), and optionally hydrogen, solvent or comonomer(s) and/or mixtures thereof into the reactor via the at least one second inlet (5a-c) into the reactor wherein the temperature, the concentrations of monomer(s), catalyst(s), and optionally comonomer(s) in the second stream is configured to adjust the temperature and/or concentration of monomer(s), catalyst(s), or optionally comonomer(s) in the reactor, and wherein the temperature, the concentration of monomer(s), catalyst(s), and/or optionally comonomer(s) in the second stream is configured to reduce a gradient in temperature and/or concentration of monomer(s), catalyst(s), and/or optionally comonomer(s) over the reactor.

7. The process according to claim 6, wherein the process further comprises the step of:

stirring the reaction mixture in the reactor.

8. The process according to claim 6, wherein the temperature of the second stream is lower than the temperature of the reaction mixture at a level of the second inlet (5a-c)).

9. The process according to claim 6, wherein the concentration of monomer(s), catalyst(s), and/or optionally comonomer(s) of the second stream is higher than the lowest concentration of monomer(s), catalyst(s), and/or optionally comonomer(s) of the reaction mixture at a level of the second inlet (5a-c).

10. The process according to claim 6, wherein the temperature, the concentration of monomer(s), catalyst(s), and/or optionally comonomer(s) in the second stream is configured to remove the gradient in temperature and/or concentration of monomer(s), catalyst(s), and/or optionally comonomer(s) over the reactor.

\* \* \* \* \*